April 21, 1953
E. R. HAMMOND
2,635,916
WINDBREAKER FOR BABY STROLLERS
Filed March 7, 1951
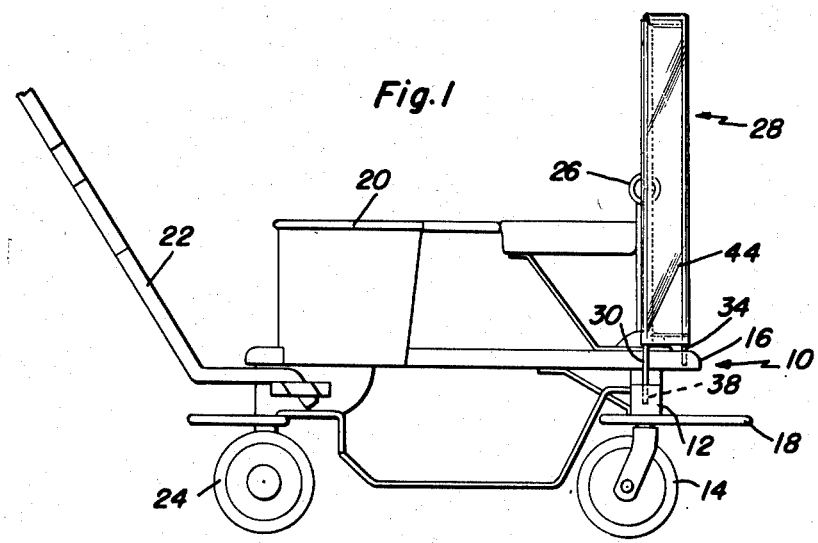
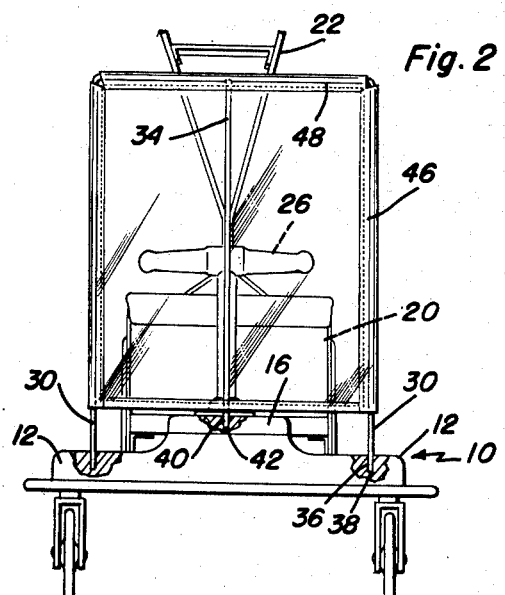
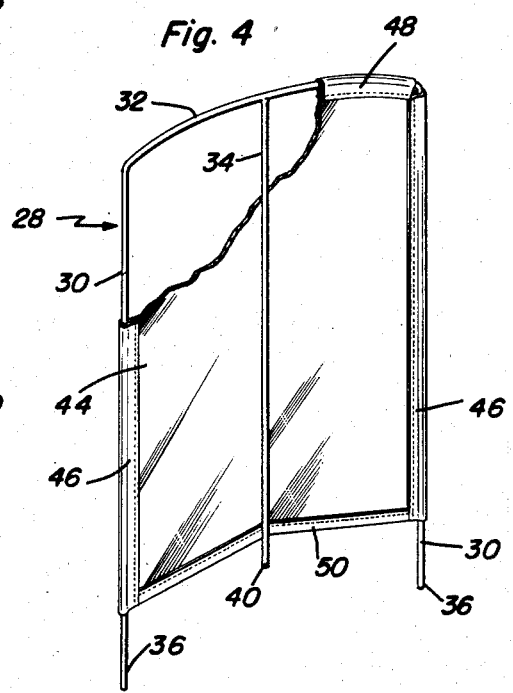
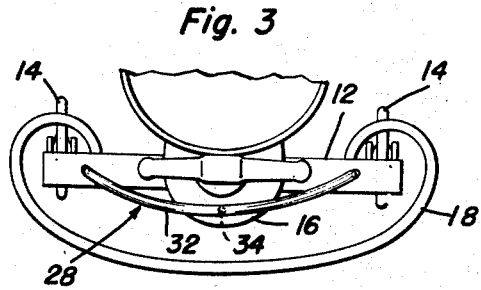
Edward R. Hammond
INVENTOR.

Patented Apr. 21, 1953

2,635,916

UNITED STATES PATENT OFFICE 2,635,916

WINDBREAKER FOR BABY STROLLERS

Edward R. Hammond, Baltimore, Md.

Application March 7, 1951, Serial No. 214,394

2 Claims. (Cl. 296—78)

This invention relates generally to baby strollers, more particularly to a wind breaker therefor and the combination of the wind breaker with the baby stroller.

A primary object of the invention is to provide a shield disposable upon the front end of a baby stroller to protect a child lying therein from the wind, it being understood that all baby strollers are ambulant and may be shifted so that the wind breaker is disposed so as to protect the child.

Another object of this invention is to provide a wind breaker which is almost completely transparent while giving adequate protection.

Yet another object of this invention is to provide a wind breaker for a baby stroller which is easily removed and replaced, yet which is firmly held in position by reason of a novel arrangement of attachment members insertable in sockets in the frame of the stroller.

A last object to be mentioned specifically is to provide a wind breaker which is relatively inexpensive and practicable to manufacture, simple and safe to use, and which will give generally efficient and durable service.

With these objects definitely in view, this invention resides in certain novel construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the wind breaker as mounted upon a baby stroller;

Figure 2 is a front end elevational view of the wind breaker as mounted upon a baby stroller;

Figure 3 is a top plan view of the forward end portion of a baby stroller with the wind breaker mounted thereon; and Figure 4 is a view, in perspective, of the wind breaker detached from the stroller.

Similar characters of reference designate similar or identical elements and portions throughout the specification and throughout the different views in the drawing.

Referring now to the drawing in detail, the environment wherewith this invention is used includes a baby stroller having a frame generally indicated at 10, the front end portion of this frame 10 including a transversely extending frame element 12 which carries the front wheel assemblies 14. The front end portion of the frame 10 also includes a frame element 16 disposed above and extending in front of the transverse element 12. Of course, the stroller will also include a complement of other elements such as the bumper 18, a seat or cradle structure 20, a push handle 22, rear wheels 24 and possibly a handle bar structure 26, the last element being mentioned particularly because the instant invention is adapted to be used with strollers having structure extending vertically above the front end portion of the frame, the wind breaker being arched for this purpose, as will be described hereinafter.

The wind breaker generally indicated at 28 includes lateral vertical members 30 of equal length and joined by a horizontal top member 32 which is arched in a direction which may be considered forwardly, since the arched top member 32 does extend toward the front of the stroller in order to avoid the handle bar structure 26 or any other similar structure. A central vertical member 34 is rigidly secured to and depends from the center of the top member 32. In the embodiment of this invention illustrated in the drawing, each of the members 30, 32 and 34 is of metallic rod character. The center vertical member 34 is shorter than the lateral members 30. The lower ends of the lateral members 30, indicated at 36, are inserted in sockets 38 provided in the transverse element 12, as best indicated in Figures 1 and 2, and the lower end 40 of the central member 34 is inserted into a similar socket 42 provided in the central element 16 of the frame 10. The socket 42 is disposed, of course, above and forwardly of the sockets 38, and the ends 36 and 40 are simultaneously inserted into the sockets 38 and 42, when the wind breaker is attached to the frame 10.

The wind breaker also includes a sheet of transparent plastic material 44 stretched over and between the members 30, 32 and 34, channels 46 being provided on the vertical edges of the sheet 44 to receive the members 30, while a similar channel 48 is provided on the upper edge of the sheet 44 to receive the top member 32. These channels may be formed by simply stitching a hem on the plastic material, or otherwise as desired, the expedient of stitching a hem being also employed for finishing the lower edge portion 50 of the sheet.

It is desirable that the sockets 38 and 42 be simple open topped bores of a diameter very little greater than the diameter of the lower ends 36 and 40, so that the wind breaker will be stable. The disposition of the end 40 above and in front of the ends 36 has been found to give stable mounting of the wind breaker on the frame, while making such mounting easy to accomplish.

The operation of this invention will be clearly understood from a consideration of the foregoing description of the mechanical details thereof taken in connection with the drawing and with the above recited objects. Further description would appear to be unnecessary. It is understood that variation from the disclosed embodiment may be resorted to within the scope of the appended claims.

Having described the invention, what is claimed as new is:

1. The combination of a baby stroller frame and a wind breaker, the baby stroller frame having a front end including a transverse frame element and a central frame element disposed above and extending in front of the transverse element, spaced vertical sockets in said central frame element and said transverse element, said wind breaker including spaced vertical members having lower ends received in said sockets, said members including lateral members and a central member, the lower end of said central member being above the level of and in front of the lower ends of the lateral members, so that the wind breaker is easily and securely mounted on the stroller frame.

2. The combination of claim 1 wherein said wind breaker has a curved forwardly arched frame element secured to the upper ends of the vertical members and connecting the same together, and a sheet of transparent plastic stretched over and between said members.

EDWARD R. HAMMOND.

References Cited in the file of this patent

UNITED STATES PATENTS

| Number | Name | Date |
|---|---|---|
| 916,439 | Grover | Mar. 30, 1909 |
| 1,393,461 | Steele | Oct. 11, 1921 |
| 1,532,008 | Walford | Mar. 31, 1925 |
| 1,893,709 | Loewy | Jan. 10, 1933 |
| 2,193,469 | Ashton | Mar. 12, 1940 |
| 2,428,935 | Hansburg | Oct. 14, 1947 |

FOREIGN PATENTS

| Number | Country | Date |
|---|---|---|
| 315,671 | Germany | Nov. 10, 1919 |